US008458261B1

United States Patent
Liao et al.

(10) Patent No.: US 8,458,261 B1
(45) Date of Patent: Jun. 4, 2013

(54) DETERMINATION OF VALID EMAIL ADDRESSES IN A PRIVATE COMPUTER NETWORK

(75) Inventors: En-Yi Liao, Santa Clara, CA (US); Cheng-Lin Hou, Cupertino, CA (US); Chinghsien Liao, Cupertino, CA (US)

(73) Assignee: Trend Micro Incorporated, Tokyo (JP)

( * ) Notice: Subject to any disclaimer, the term of this patent is extended or adjusted under 35 U.S.C. 154(b) by 1630 days.

(21) Appl. No.: 11/401,498

(22) Filed: Apr. 7, 2006

(51) Int. Cl.
*G06F 15/16* (2006.01)

(52) U.S. Cl.
USPC .......................................................... 709/206

(58) Field of Classification Search
USPC .................. 709/206, 224, 245, 246
See application file for complete search history.

(56) References Cited

U.S. PATENT DOCUMENTS

| | | | | | |
|---|---|---|---|---|---|
| 5,822,526 | A | * | 10/1998 | Waskiewicz | 709/206 |
| 5,987,508 | A | * | 11/1999 | Agraharam et al. | 709/217 |
| 6,453,360 | B1 | * | 9/2002 | Muller et al. | 709/250 |
| 6,694,353 | B2 | * | 2/2004 | Sommerer | 709/206 |
| 6,775,691 | B1 | * | 8/2004 | Kubik et al. | 709/206 |
| 6,941,348 | B2 | * | 9/2005 | Petry et al. | 709/206 |
| 7,096,498 | B2 | * | 8/2006 | Judge | 726/22 |
| 7,346,700 | B2 | * | 3/2008 | Gould et al. | 709/232 |
| 7,409,428 | B1 | * | 8/2008 | Brabec et al. | 709/206 |
| 7,668,951 | B2 | * | 2/2010 | Lund et al. | 709/223 |
| 7,739,338 | B2 | * | 6/2010 | Taylor | 709/206 |
| 7,849,142 | B2 | * | 12/2010 | Clegg et al. | 709/206 |
| 7,870,200 | B2 | * | 1/2011 | Slater et al. | 709/206 |
| 2004/0010554 | A1 | * | 1/2004 | Hall et al. | 709/206 |
| 2004/0122847 | A1 | * | 6/2004 | Rodgers | 707/102 |
| 2005/0027781 | A1 | * | 2/2005 | Curry et al. | 709/200 |
| 2005/0027879 | A1 | * | 2/2005 | Karp | 709/238 |
| 2005/0149479 | A1 | * | 7/2005 | Richardson et al. | 707/1 |
| 2005/0198161 | A1 | * | 9/2005 | Rooke et al. | 709/206 |
| 2005/0228867 | A1 | * | 10/2005 | Osborne et al. | 709/206 |
| 2006/0031359 | A1 | * | 2/2006 | Clegg et al. | 709/206 |
| 2006/0168017 | A1 | * | 7/2006 | Stern et al. | 709/206 |

OTHER PUBLICATIONS

Understanding Directory Harvest Attacks. [online] [Retrieved on Mar. 30, 2006]. Retrieved from the InternetURL:http://www.pcmag.com/print_article.htm.>.
Keisuke Ishibashi, et al., "Detecting Mass-Mailing Infected Hosts by Mining DNS Traffic Data", Sigcomm '05 workshops, 6 sheets, Aug. 22-26, 2005, PA, USA.

* cited by examiner

*Primary Examiner* — Philip Chea
*Assistant Examiner* — Eric W Shepperd
(74) *Attorney, Agent, or Firm* — Okamoto & Benedicto LLP

(57) ABSTRACT

In one embodiment, a method of generating a listing of valid email addresses in a private computer network includes monitoring of inbound emails and outbound delivery failure notification emails. Recipient email addresses of inbound emails may be indicated in the listing as valid email addresses. The delivery failure notification emails may be indicative of receipt in the private computer network of an undeliverable email. The recipient email address of the undeliverable email may be identified in the listing as an invalid email address. Comparing the recipient email addresses of undeliverable emails and inbound emails advantageously allows generation of the listing of valid email addresses in the private computer network without having to ask an email server for such a listing.

3 Claims, 5 Drawing Sheets

DETERMINATION OF VALID EMAIL ADDRESSES IN A PRIVATE COMPUTER NETWORK

BACKGROUND OF THE INVENTION

1. Field of the Invention

The present invention relates generally to data processing, and more particularly but not exclusively to electronic mails.

2. Description of the Background Art

Electronic mail ("email") has become a relatively common means of communication among individuals. Among its advantages, email is relatively convenient, fast, and cost-effective compared to traditional mail. It is thus no surprise that a lot of businesses and home computer users have some form of email access.

An email server may be employed to store and distribute emails. Each user having an email account with the email server has a corresponding email address. The email server receives inbound emails and stores them by email address. The user associated with an email address may employ an email client to retrieve his email from the email server.

In some applications, it is important to know if an inbound email is for a valid (i.e., has a corresponding email account) email address associated with the email server. For example, some organizations may have policies controlling receiving of emails by particular email addresses. As another example, an intermediate node (e.g., email gateway) may perform security actions on an email depending on whether or not the email is going to a valid email address in the email server. Therefore, a technique for determining valid email addresses associated with an email server is generally desirable.

SUMMARY

In one embodiment, a method of generating a listing of valid email addresses in a private computer network includes monitoring of inbound emails and outbound delivery failure notification emails. Recipient email addresses of inbound emails may be indicated in the listing as valid email addresses. The delivery failure notification emails may be indicative of receipt in the private computer network of an undeliverable email. The recipient email address of the undeliverable email may be identified in the listing as an invalid email address. Comparing the recipient email addresses of undeliverable emails and inbound emails advantageously allows generation of the listing of valid email addresses in the private computer network without having to ask an email server for such a listing.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Components may be implemented separately in multiple modules or together in a single module.

Figure 1:
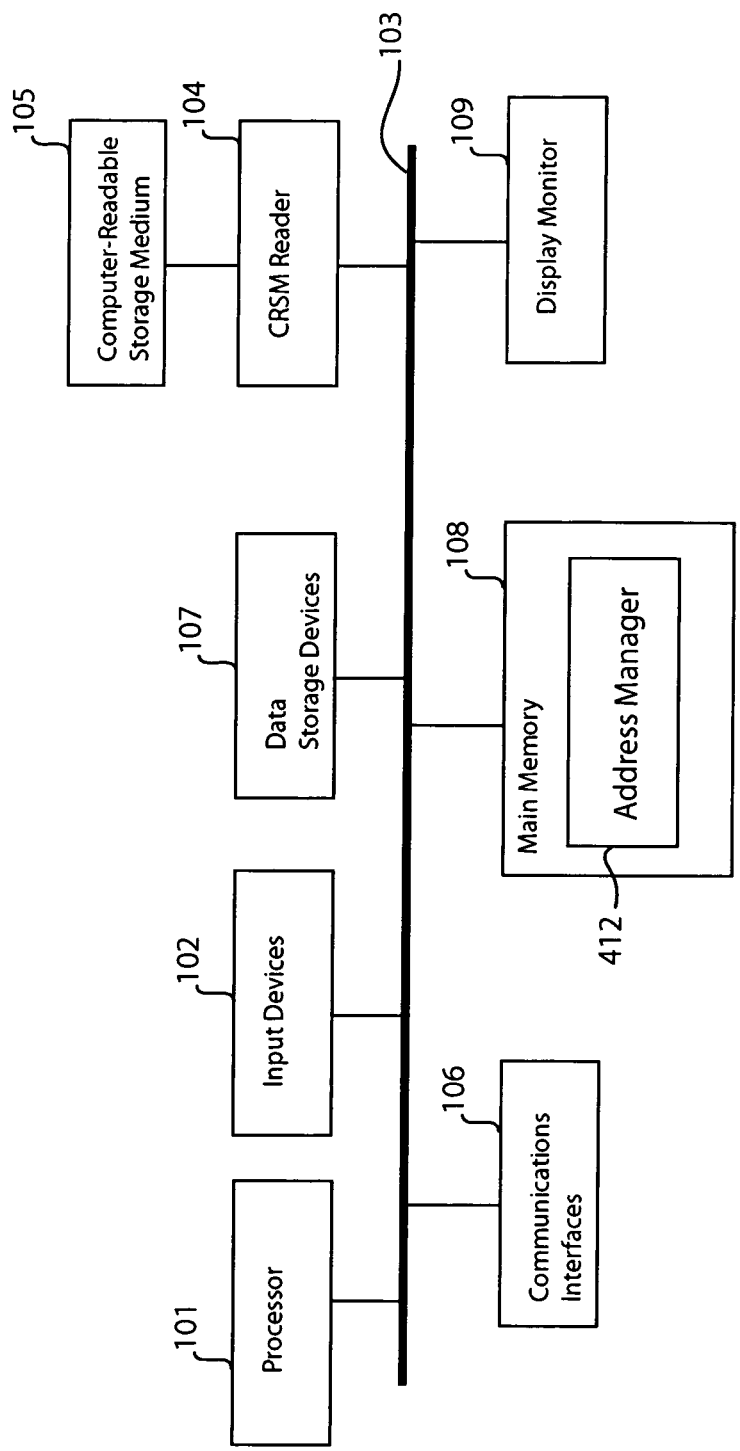
FIG. 1 schematically shows an example computer that may be used in embodiments of the present invention.

Referring now to FIG. 1, there is shown a schematic diagram of an example computer that may be used in embodiments of the present invention. The computer shown in the example of FIG. 1 may be employed as an email gateway 410 (see FIG. 4), for example. The computer of FIG. 1 may have less or more components to meet the needs of a particular application. As shown in FIG. 1, the computer may include a processor 101, such as those from the Intel Corporation or Advanced Micro Devices, for example. The computer may have one or more buses 103 coupling its various components. The computer may include one or more input devices 102 (e.g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., LCD, cathode ray tube, flat panel display), communications interfaces 106 (e.g., network adapters, modems) for communicating over computer networks, one or more data storage devices 107 (e.g., hard disk drive, optical drive, FLASH memory), and a main memory 108 (e.g., RAM). Software embodiments may be stored in a computer-readable storage medium 105 for reading into a data storage device 107 or main memory 108. Software embodiments may also be received over a computer network by way of a communications interface 106. In the example of FIG. 1, main memory 108 includes a later described address manager 412 (see FIG. 4), which may be configured to monitor emails for address information. The address manager 412 may be executed by processor 101.

Figure 2:
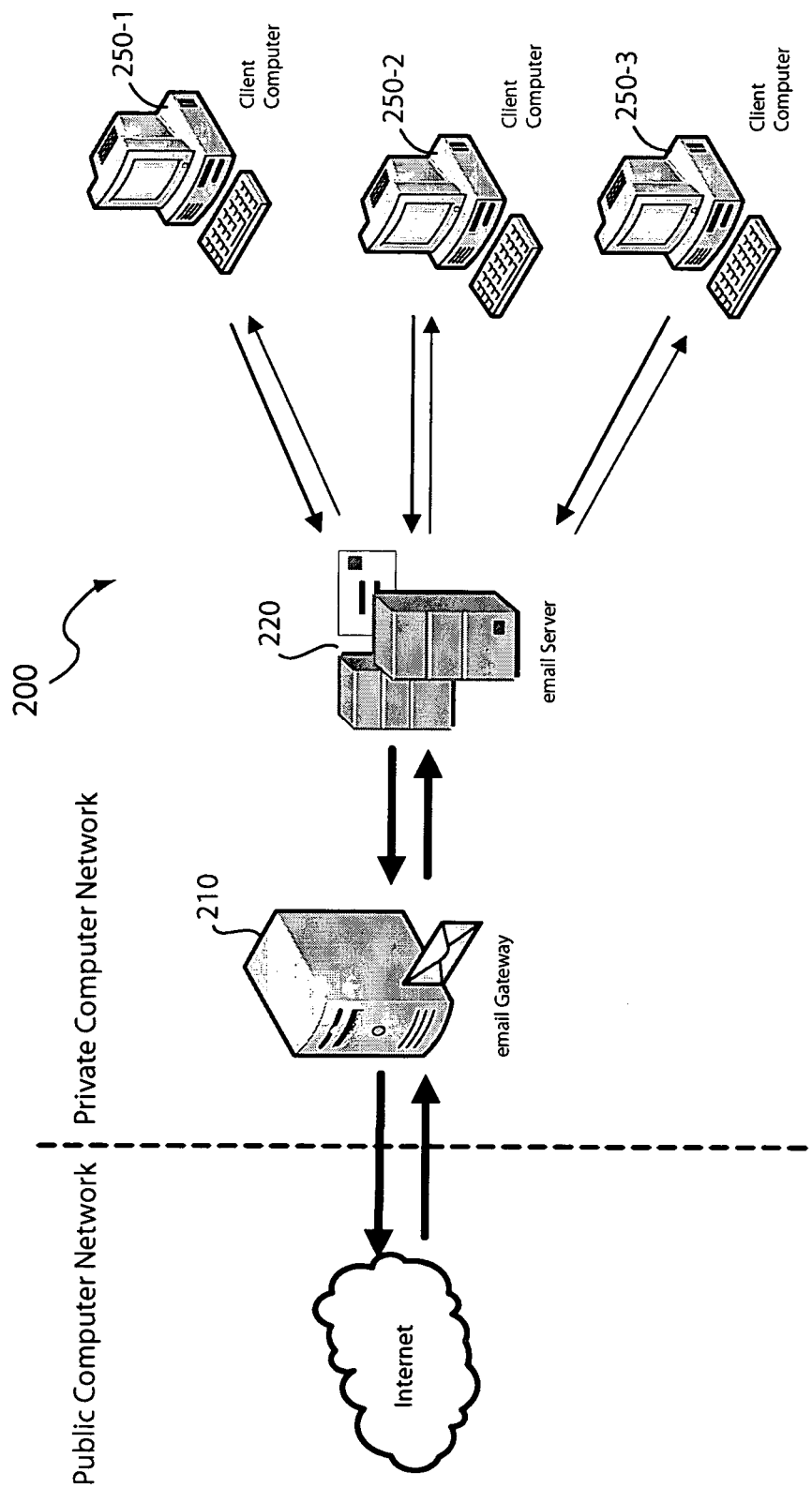
FIGS. 2 and 3 schematically show example computing environments where embodiments of the present invention may be employed.

FIG. 2 schematically shows an example computing environment where embodiments of the present invention may be employed. In the computing environment of FIG. 2, a private computer network 200 includes an email gateway 210, an email server 220, and a plurality of client computers 250 (i.e., 250-1, 250-2, ... ). The public computer network may include the Internet. Client computers 250 may be desktop computers employed by users to send and receive emails. Accordingly, the client computers 250 may have an email client working with the email server 220, which controls storage and distribution of emails in the computer network.

In the example of FIG. 2, all inbound (i.e., coming to the private computer network 200) and outbound (i.e., going out of the private computer network) emails are routed through the email gateway 210. To send an email to a recipient on the Internet, a user on a client computer 250 composes the email and forwards it to the email server 220, which then forwards the email to the email gateway 210. The email gateway 210, in turn, forwards the email to the recipient. Likewise, all inbound emails are routed through the email gateway 210, which forwards the emails to the email server 220 for storage and distribution. Users on client computers 250 may retrieve their emails from the email server 220.

Figure 3:
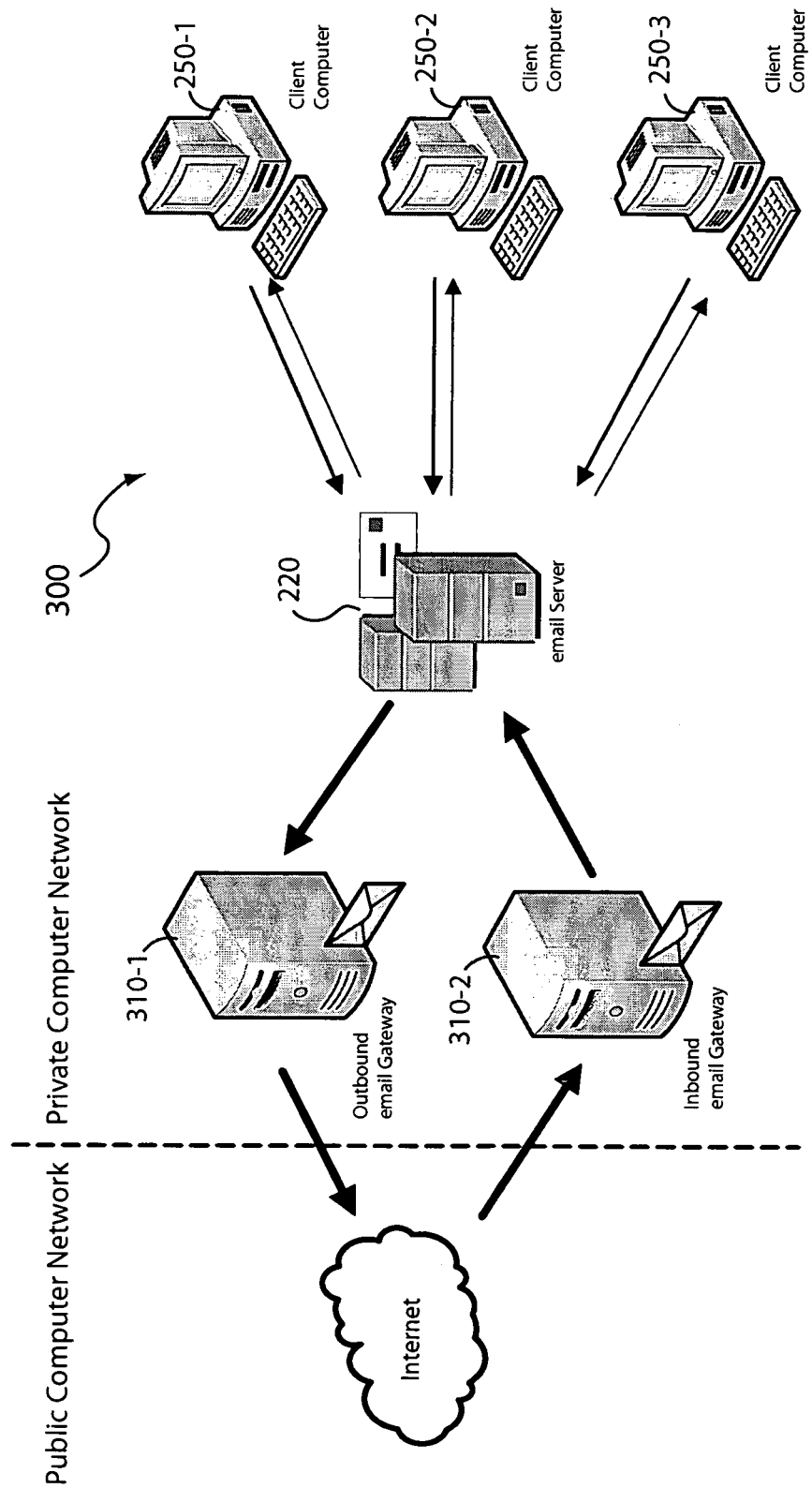

Depending on traffic load on the email gateways 210, or for other reasons, a network administrator may decide to use two separate email gateways, one for inbound emails and another for outbound emails. This is done in the computing environment of FIG. 3, where the computer network 300 includes two email gateways 310 (i.e., 310-1, 310-2). In the example of FIG. 3, all outbound emails are routed through the outbound email 310-1, while all inbound emails are routed through the inbound email gateway 310-2. The email server 220 and client computers 250 operate as discussed with reference to FIG. 2.

The features that make email popular also lead to its abuse. Specifically, some advertisers have resorted to mass emailing of advertisements over the Internet. These mass emails, which are also referred to as "spam mails" or simply "spam," are sent to computer users whether or not they asked for it. Spam is not only a nuisance, but is also an economic burden to businesses due to resulting loss in employee productivity.

Spammers (and hackers) may perform a directory harvest attack (DHA) to learn of valid email addresses. In one type of directory harvest attack, a spammer may send emails to different email addresses in a particular domain. Emails sent to invalid (i.e., non-existent) email addresses are bounced (i.e., rejected) by a server in that domain. Emails that are not bounced may thus be assumed as sent to valid email addresses. The spammer may send more spam to these valid email addresses or sell these email addresses to other spammers. As can be appreciated, a directory harvest attack not only allows spammers to obtain valid email addresses, but may also put tremendous traffic load to servers in the domain.

An email gateway may be employed to protect a computer network from a directory harvest attack or other threats. By being the first line of defense from the public computer network, an email gateway may screen inbound emails. To perform this screening, the email gateway may need to know the valid email addresses associated with the email server, which, for performance and security reasons, is typically running in a computer separate from that of the email gateway. Although the email server knows all of the valid email addresses in the domain, the email gateway typically does not have direct access to this information.

Valid email addresses may be manually imported into the email gateway. For example, the network administrator may collect lists of valid email addresses from backend (i.e., into the network after the email gateway) email servers or directory services and manually import the lists into the email gateway. One problem with this approach is that the lists may need to be periodically manually updated due to new or discontinued email accounts (e.g., new hires or layoffs in a company). Another problem with this approach is that it is prone to human error. For example, an administrator may forget to export email addresses for an entire sub-domain.

Another approach is to automatically import valid email addresses from directory services to the email gateway. For example, a synchronization channel may be set up between the email gateway and backend email servers. More particularly, the email gateway may regularly query the email servers for valid email addresses. Although this approach is technically possible, the resulting implementation may be too complicated and error-prone, especially in environments where there are several email servers from different vendors. Furthermore, administrators may have difficulty establishing a synchronization channel for various reasons (e.g., security and configuration), such as when the email gateway and email servers are maintained by different departments within the same company.

The email gateway may also know the valid email addresses in the domain by querying backend services on demand. For example, the email gateway may query an email server for every email received in the email gateway. In this approach, the email gateway does not maintain a local list of valid email addresses. Instead, the email gateway dynamically queries backend directory services to determine if the email has a valid recipient email address. One problem with this approach is that in a complex environment there may be several different types of directory services or ways of storing valid email addresses on backend email servers, resulting in a relatively complicated implementation that may be error-prone and have performance issues. This is especially true when the email servers are from different vendors.

Figure 4:
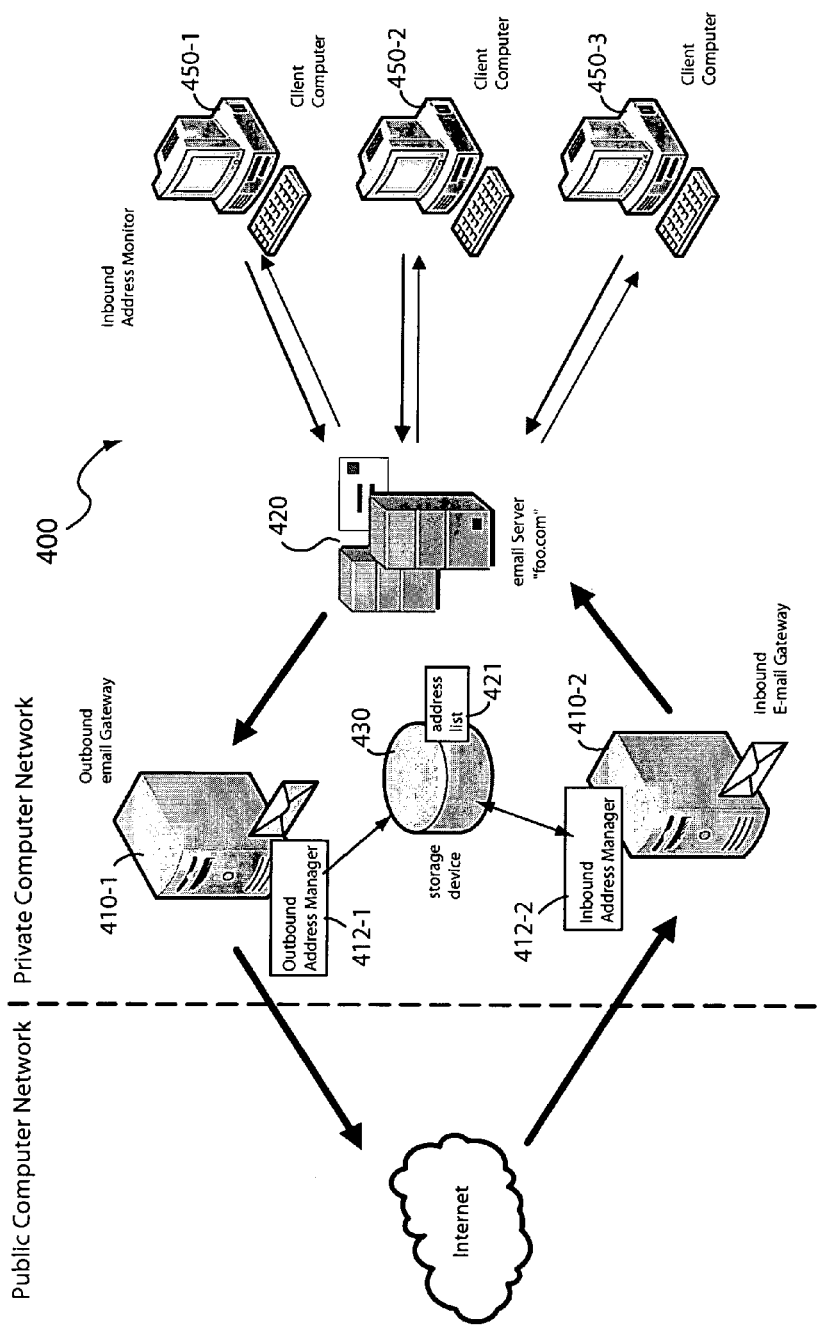
FIG. 4 schematically shows a computing environment in accordance with an embodiment of the present invention.

Referring now to FIG. 4, there is schematically shown a computing environment in accordance with an embodiment of the present invention. In the example of FIG. 4, a private computer network 400 includes a plurality of email gateways 410 (i.e., 410-1, 410-2), an email server 420, a storage device 430, and a plurality of client computers 450 (i.e., 450-1, 450-2, ... ). The public computer network may include the Internet. The client computers 450 may be desktop computers employed by users to send and receive emails by way of the email server 420. A client computer 450 may have a commercially available email client, such as the Microsoft Outlook™ software, for composing, sending, and receiving emails. The email server 420 may include a commercially available email server, such as the Microsoft Exchange™ or the Lotus Domino™ email server. The email server 420 serves the domain "foo.com" in the following example.

In the example of FIG. 4, all outbound emails are routed through the outbound email gateway 410-1, while all inbound emails are routed through the inbound email gateway 410-2. That is, email gateways 410-1 and 410-2 are implemented as separate nodes (i.e., in separate computer hardware) in the private computer network 400. In other embodiments, all outbound and inbound emails are routed through the same email gateway, while in yet other embodiments inbound and outbound emails are routed through more than one email gateway. In these different embodiments, the functionalities of the email gateways 410 may be combined or distributed as needed. For example, a single address manager 412 in a single email gateway 410 may be configured to monitor both inbound and outbound emails. In light of the present disclosure, one of ordinary skill in the art will appreciate that other topologies are possible without detracting from the merits of the present invention.

The email gateways 410 are "gateways" in that they buffer the email server 420 (and other backend email servers in the network 400) from the public computer network. In the example of FIG. 4, the email gateways 410 are located at the edge (i.e., just before the public computer network) of the private computer network 400; they serve as a first entry point for emails entering the private computer network 400 from the Internet. As shown in FIG. 4, for security and performance reasons, the email gateways 410 are running on computers that are separate from the email server 420. In one embodiment, each of the email gateways 410 comprises a simple mail transfer protocol (SMTP) gateway. The email gateways 410 may include anti-spam or antivirus software, for example.

The storage device 430 (e.g., memory, hard disk, optical disk) may be a stand alone storage device or one that is part of another computer. In the example of FIG. 4, the storage device 430 is depicted as being separate from both the email gateways 410-1 and 410-2. As can be appreciated, the storage device 430 may also be part of either the email gateway 410-1 or 410-2, for example. The storage device 430 may be remotely accessed by an email gateway 410 over a local area network.

The email address list 421 may comprise computer-readable data. The email address list 421 may be in any suitable format without detracting from the merits of the present invention. For example, the email address list 421 may comprise a table, a lightweight directory access protocol (LDAP) based directory tree, a database, plain text file, and so on.

As shown in FIG. 4, an email gateway 410 may include an address manager 412 (i.e., 412-1, 412-2). In one embodiment, an address manager 412 comprises computer-readable program code for parsing address information from an email, posting the address information in computer-readable storage, and processing the address information. An address manager 412 may be implemented as a module of an existing email gateway software or a standalone process (e.g., a proxy, a gateway, or a packet monitor). For example, an address manager 412 may perform its functions by receiving in the background copies of email traffic through its email gateway 410.

In the example of FIG. 4, the inbound address manager 412-2 is configured to parse the recipient email address of inbound emails routed through the inbound email gateway 410-2, and store that recipient email address in the email address list 421 in the storage device 430. The recipient email address may be identified as "valid" in the email address list 421. In the event the recipient email address is already identified as "invalid" in the email address list 421, the inbound address manager 412-2 may be configured to not make any changes to the email address list 421 (i.e., keep the recipient email address as invalid).

For example, assuming the email server 420 is for a domain name "foo.com" and an inbound email addressed to "smith@foo.com" is received by the inbound email gateway 410-2, the inbound address manager 412-2 parses the email to obtain the address "smith@foo.com" and stores that address in the email address list 421. In the email address list 421, "smith@foo.com" may be identified as a valid email address. For example, "smith@foo.com" may be stored in its own sub-list in the address list 421 or tagged with an appropriate flag. If "smith@foo.com" already has an entry in the address list 421, the inbound address manager 412-2 does not make any changes to the entry for "smith@foo.com."

According to section 6.1 of the IETF RFC 2821, an email receiver in accordance with SMTP is responsible for delivering or relaying received email. If the email receiver somehow cannot deliver or relay the email, the receiver is advised to send a delivery failure notification to the address in the envelope return path. Accordingly, SMTP-compliant email servers typically send a delivery failure notification email back to the sender of an email that is addressed to an invalid email address. In one embodiment, the outbound address manager 412-1 is configured to monitor outbound email traffic for such delivery failure notification emails. In SMTP-compliant email systems, the notification emails may be identified as those whose sender in the envelope is null. For each delivery failure notification email, the outbound address manager 412-1 parses the notification email to determine the reason for the delivery failure. If the reason for the delivery failure is "user unknown" (i.e., the email is addressed to an invalid email address), the outbound address manager 412-1 identifies the recipient email address of the undeliverable email (i.e., the one that caused the delivery notification failure) and stores that email address in the address list 421 as an invalid email address.

For example, assuming an email addressed to "tom@foo.com" is received by the email server 420 for the domain "foo.com" and "tom@foo.com" does not have a corresponding email account in the "foo.com" domain (i.e., "tom@foo.com" is an invalid email address), the email server 420 will send out a delivery failure notification to the sender of that email. The outbound address manager 412-1 will receive the notification email in the outbound gateway 410-1 and parse the notification to determine that it is a delivery failure notification responsive to the receipt of an email addressed to "tom@foo.com." Accordingly, the outbound address manager 412-1 stores "tom@foo.com" in the address list 421 and identify it as invalid. In the event "tom@foo.com" has been previously identified in the address list 421 as being a valid email address, the outbound address manager 412-1 may override the previous posting and identify "tom@foo.com" as invalid (e.g., by changing a flag for "tom@foo.com", moving "tom@foo.com" to a different sub-list, etc.). If for any reason there is no entry for "tom@foo.com" in the address list 421, the outbound address manager 412-1 adds an entry for "tom@foo.com" and identifies it as an invalid email address. This results in the address list 421 having a listing of valid email addresses in the domain.

Alternatively or in addition, the outbound email address manager 412-1 may be configured to parse all regular (e.g., not a notification email) outbound emails for the email address of the sender, store that sender email address list 421, and identify that sender email address as valid regardless of whether or not it is already identified in the email address list 421. This covers situations when an email receiver does not follow section 6.1 of IETF RFC 2821 or when the administrator configures an email gateway or another node within the network to prevent forwarding of delivery failure notifications. For example, if Mary using the client computer 450-1 at "foo.com" sends an outbound email to "john@bar.com" using her email address "mary@foo.com," the outbound address manager 412-1 may parse the email to retrieve "mary@foo.com." The outbound address manager 412-1 may store "mary@foo.com" in the address list 421 and identify it as valid (even if address list 421 already identifies "mary@foo.com" as invalid; i.e., the previous entry is overridden).

Advantageously, the above-described technique allows one or more email gateways to automatically generate a listing of valid email addresses without having to query or interact with the email server 420 or other directory service to get such a listing. An email gateway may employ the list of valid email addresses for anti-spam, anti-virus, policy enforcement, and other network security applications, for example.

Figure 5:
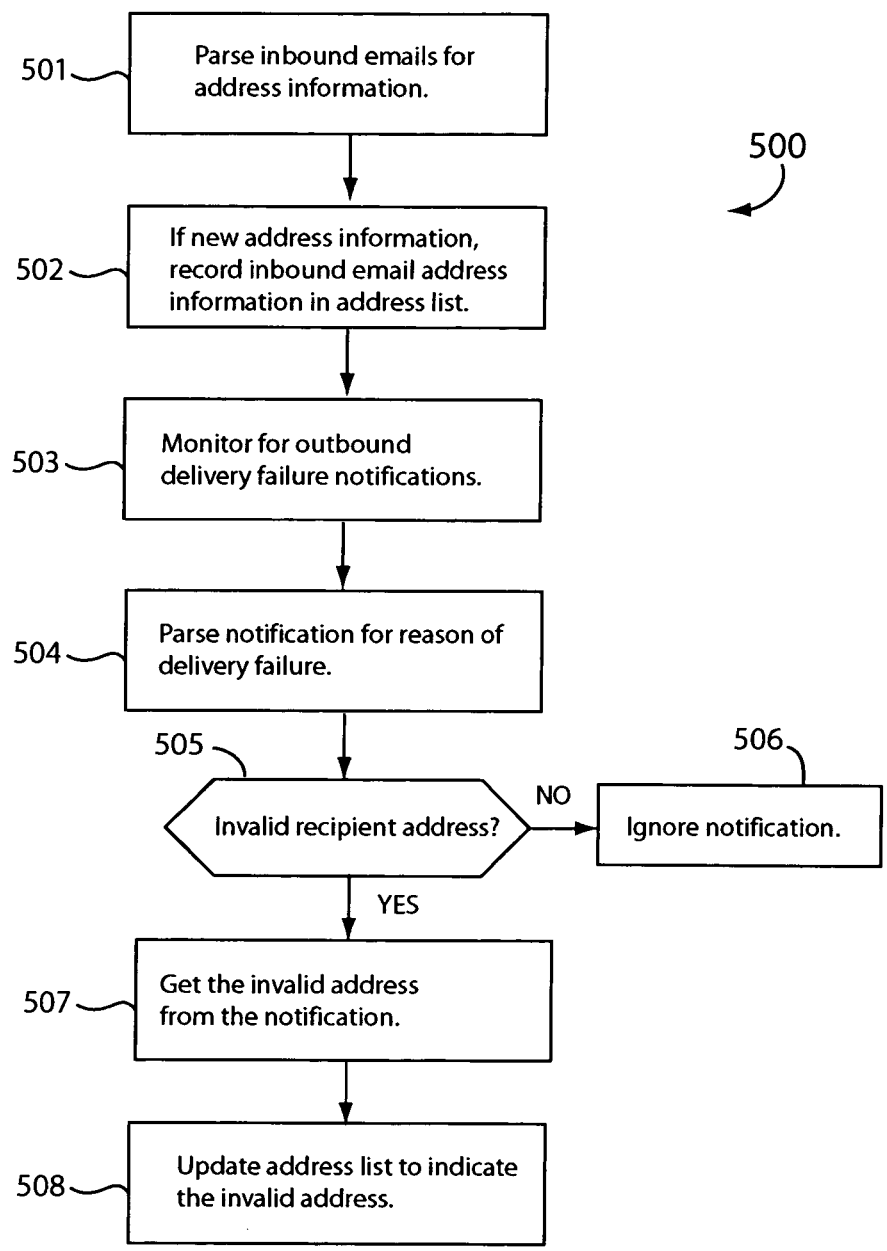
FIG. 5 shows a flow diagram of a method of automatically determining valid email addresses in a computer network in accordance with an embodiment of the present invention.

FIG. 5 shows a flow diagram of a method 500 of automatically determining valid email addresses in a computer network in accordance with an embodiment of the present invention. The method 500 is explained using the components shown in FIG. 4 for illustration purposes only, not as a limitation. Accordingly, separate email gateways and address managers are employed to process inbound and outbound emails. It should be understood, however, that a single email gateway with an address manager may be configured to process both inbound and outbound emails.

In step 501, an inbound address manager parses inbound emails for address information, which in this step may comprise a recipient email address in each of the inbound emails. Table 1 below shows an example simplified SMTP communication between an email client on the Internet and an inbound email gateway, which runs the inbound address manager. In the example of Table 1, "S" (which stands for "server") represents communication by the inbound email gateway and "C" (which stands for "client") represents communication by the client.

TABLE 1

```
S: 220 foo.com SMTP ready
C: HELO bar.com
S: 250 foo.com
C: MAIL FROM: <john@bar.com>
S: 250 OK
C: RCPT TO: <smith@foo.com>
S: 250 OK
C: RCPT TO: <tom@foo.com>
S: 250 OK
C: DATA
R: 354 start mail input; end with <CRLF>.<CRLF>
S: ......
S: ......
S: etc
R: 250 OK
S: QUIT
```

In the example of Table 1, the email client on the Internet sent an email from. "john@bar.com" to "smith@foo.com" and "tom@foo.com" in the domain of the inbound email gateway, which is "foo.com" in this example. The inbound address manager detects the incoming emails, and parses each of them to retrieve their respective recipient email addresses, which are "smith@foo.com" and "tom@foo.com."

In step 502, the inbound address manager records inbound email address information in an email address list if there is no previous entry for the address information in the email address list. Continuing the example of Table 1, the inbound address manager stores "smith@foo.com" and "tom@foo.com" in the email address list and identifies them as being valid email addresses. The email address list may comprise any suitable computer-readable storage mechanism, such as a table, database, directory structure, text file, and so on. Table 2 below shows an example email address list with a boolean flag ("IsValid") indicating whether the email address is valid or not. When the flag is True, the email address is valid; otherwise, the email address is invalid.

TABLE 2

| Email address | IsValid |
|---|---|
| smith@foo.com | True |
| tom@foo.com | True |

In step 503, an outbound address manager running in an outbound email gateway monitors outbound email traffic for delivery failure notification emails. Such notification email may be sent by a receiving email node when the email is not deliverable.

In step 504, the outbound address manager parses outbound delivery failure notification emails to determine the reason for the delivery failure. In one embodiment, the outbound address manager checks the notification emails for an error message indicating that an undeliverable email has been received in the computer network and that the undeliverable email has an invalid recipient address (i.e., addressed to a non-existent email account). Table 3 below shows an example notification email.

TABLE 3

```
Return-path: <MAILER-DAEMON@foo.com>
Received: from localhost (localhost)
    by foo.com (8.12.10+Sun/8.12.2) id jAG1UTaB008867;
    Tue, 15 Nov 2005 17:30:29 -0800 (PST)
Date: Tue, 15 Nov 2005 17:30:29 -0800 (PST)
From: Mail Delivery Subsystem <MAILER-DAEMON>
Message-Id: <200511160130.jAG1UTaB008867@foo.com>
To: John <john@bar.com>
MIME-Version: 1.0
Content-Type: multipart/report; report-type=delivery-status;
    boundary ="jAG1UTaB008867.1132104629/foo.com"
Subject: Returned mail: see transcript for details
Auto-Submitted: auto-generated (failure)
Content-Length: 1558
This is a MIME-encapsulated message
--jAG1UTaB008867.1132104629/foo.com
The original message was received at Tue, 15 Nov 2005 17:30:08
-0800 (PST)
from bar.com [10.2.15.51]
    ----- The following addresses had permanent fatal errors -----
tom@foo.com
(reason: 550 <tom@foo.com>: User unknown in local recipient table)
    ----- Transcript of session follows -----
... while talking to [10.2.42.207] :
>>> DATA
<<< 550 <tom@foo.com>: User unknown in local recipient table
550 5.1.1 tom@foo.com... User unknown
--jAG1UTaB008867.1132104629/foo.com
Content-type: message/delivery-status
Reporting-MTA: dns; foo.com
Received-From-MTA: DNS; bar.com
Arrival-Date: Tue, 15 Nov 2005 17:30:08 -0800 (PST)
Final-Recipient: RFC822; tom@foo.com
Action: failed
Status: 5.1.1
Remote-MTA: DNS; [10.2.42.207]
Diagnostic-Code: SMTP; 550 <tom@foo.com>: User unknown in
local recipient table
Last-Attempt-Date: Tue, 15 Nov 2005 17:30:29 -0800 (PST)
--jAG1UTaB008867.1132104629/foo.com
Content-Type: message/rfc822
Return-Path: <john@bar.com>
Received: from bar.com (bar.com [10.2.15.51])
    by foo.com (8.12.10+Sun/8.12.2) with SMTP id jAG1TiaB008865;
    Tue, 15 Nov 2005 17:30:08 -0800 (PST)
Date: Tue, 15 Nov 2005 17:29:44 -0800 (PST)
From: John <john@bar.com>
Message-Id: <200511160130.hAG1TiaB008865@foo.com>
Three Cats
--jAG1UTaB008867.1132104629/foo.com--
```

In the example delivery failure notification email of Table 3, the entry "550 5.1.1 tom@foo.com . . . User unknown" indicates that "tom@foo.com" is an invalid email address. The outbound address manager may search for this error message in the notification email to determine if the reason for the notification is an invalid recipient email address. Preferably, the outbound address manager is configured to recognize error message formats of various popular email servers. IETF RFC 3463 defines status codes for compatible email systems.

In steps 505 to 506, the outbound address manager ignores the notification email if the reason for the email delivery failure is not due to an invalid recipient email address.

In steps 505 to 507, the outbound address manager parses the notification email for the invalid recipient address if the email delivery failure is due to the invalid recipient address. In the current example, the notification email indicates that "tom@foo.com" is addressed to an unknown user. In other words, the email server does not recognize the address "tom@foo.com." Accordingly, the outbound address manager retrieves "tom@foo.com" from the notification email.

In step 508, the outbound address manager updates the address list to indicate the invalid recipient address. In the current example, the outbound address manager updates the entry for "tom@foo.com" in the address list to indicate that it is an invalid email address as shown in Table 4.

TABLE 4

| Email address | IsValid |
|---|---|
| smith@foo.com | True |
| tom@foo.com | False |

Instead of using a Boolean flag in a single general list to indicate whether or not an email address is valid, the address list may also be divided into two lists: a first list listing all email addresses parsed by the inbound address manager from inbound emails and designated as valid, and a second list listing email addresses parsed by the outbound address manager from outbound delivery failure notification emails and designated as invalid. In that case, email addresses in the first list but are not in the second list may be deemed valid email addresses. Other ways of maintaining an address list are also possible without detracting from the merits of the present invention. Note that the address list may be configured to allow the administrator to modify an entry for an invalid email address to make it valid to accommodate new email accounts (e.g., for newly hired employees).

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of automatically determining valid email addresses in a computer network, the method comprising:
   extracting an email address of a recipient from an inbound email, the inbound email entering a private computer network;
   entering the email address in a listing of address information;
   after entering the email address in the listing of address information, identifying the email address in a first outbound email leaving the private computer network, the first outbound email being a notification email indicative of receipt in the private computer network of a particular email that is undeliverable;
   in response to identifying the email address in the first outbound email, updating the listing of address information to indicate that the email address is an invalid email address having no corresponding email account in the private computer network;
   after updating the listing of address information to indicate that the email address is an invalid email address, identifying the email address in a second outbound email leaving the private computer network; and
   in response to identifying the email address in the second outbound email, updating the listing of address information to indicate that the email address is a valid email address.

2. The method of claim 1 wherein the listing of address information comprises a database.

3. The method of claim 1 wherein the listing of address information comprises a table, wherein each entry of email address in the table has a corresponding indicator of whether the entry is for a valid or an invalid email address.

\* \* \* \* \*